(12) United States Patent  
Paice

(10) Patent No.: US 7,274,280 B1  
(45) Date of Patent: Sep. 25, 2007

(54) NINE-PHASE STEP-UP/STEP-DOWN AUTOTRANSFORMER

(76) Inventor: Derek Albert Paice, 114 Rosewood Ct., Palm Harbor, FL (US) 34685

( * ) Notice: Subject to any disclaimer, the term of this patent is extended or adjusted under 35 U.S.C. 154(b) by 0 days.

(21) Appl. No.: 11/436,133

(22) Filed: May 18, 2006

(51) Int. Cl.  
*H02M 5/00* (2006.01)  
*H02M 5/06* (2006.01)  
*H01F 21/02* (2006.01)

(52) U.S. Cl. ............ 336/148; 363/154; 363/152; 363/148; 336/5

(58) Field of Classification Search ........ 336/147–148, 336/5, 15; 323/355, 361; 363/148–149, 363/152–155  
See application file for complete search history.

(56) References Cited

U.S. PATENT DOCUMENTS 5,148,357 A * 9/1992 Paice ..................... 363/5  
6,249,443 B1 * 6/2001 Zhou et al. ............... 363/5  
6,335,872 B1 * 1/2002 Zhou et al. ............. 363/154  
6,861,936 B2 * 3/2005 Kamath .................. 336/148

* cited by examiner

*Primary Examiner*—Anh Mai

(57) ABSTRACT

An irregular polygon connection of a three-phase autotransformer using only five windings per phase provides a source of nine-phase power suitable for an 18-pulse AC to DC power converter. The windings are connected in a manner to limit the amount of third harmonic current circulating in them. When the autotransformer is used to power a nine-phase AC to DC converter its kVA rating is typically less than 50% of the DC load kW. An additional tap on one of the five windings allows a wide range of AC output voltages to be obtained. Voltages greater than, less than, or equal to the AC input voltage can be obtained. Other multi-phase outputs are feasible. Additional isolated windings can provide means for the invention to operate as an efficient double-wound transformer.

7 Claims, 9 Drawing Sheets

NINE-PHASE STEP-UP/STEP-DOWN AUTOTRANSFORMER

FIELD OF THE INVENTION

The invention relates to static AC to DC power converters such as can be used for AC or DC motor drive systems.

REFERENCES CITED

U.S. Patent Documents

| | | |
|---|---|---|
| 5,124,904 | June 1992 | Paice |
| 5,619,407 | April 1997 | Hammond |
| 6,335,872 | January 2002 | Zhou, et.al. |

Other Publications

"Power Electronic Converter Harmonics" by Derek A. Paice, published 1995 by the IEEE Press, ISBN 0-7803-1137-X

BACKGROUND OF THE INVENTION

To meet industry needs for electrical power converters which convert AC to DC without injecting large amounts of harmonic currents into the power system, numerous transformer and converter topologies are available, some of which are described in the documents referenced above. Methods whereby three-phase power is converted to nine-phase power before processing, are described in several U.S. patents. For many industrial applications a small step down of voltage is desirable. Cost effective designs used in the variable frequency drive industry, and cited in the references above, use at least six windings on each phase of an autotransformer. A polygon transformer with five windings per phase, such as described by Zou et. al. requires only five windings per phase, but has the disadvantage of having a large circulating third harmonic current which significantly increases the transformer kVA rating.

The invention described here provides for an efficient design that in its preferred embodiment using only five windings per phase. It is a simplification and improvement on the methods described in the referenced patents, namely U.S. Pat. Nos. 5,124,904, 5,619,407, and 6,335,872.

BRIEF SUMMARY OF THE INVENTION

A three-phase, nonagon (nine sided polygon) connected autotransformer using appropriate turns ratios provides a nominally balanced nine-phase set of output voltages. The output voltages are smaller than the input voltages by about 11%, an amount especially suitable for 480 V industrial power converter systems. The invention requires only five windings on each phase of the transformer, and has an equivalent double-wound kVA rating that is less than 50% of the load kW. It is easier to manufacture than previously disclosed methods using six windings per phase and represents a useful practical simplification over the prior art.

If required, a wide range of output voltages can be obtained by feeding the three-phase input supply to tappings on one or more of the five windings or interconnections thereof.

In conjunction with an extra isolated winding, the autotransformer topology can be used as the secondary winding configuration of a double-wound isolation transformer. Because the nonagon connection provides means to circulate third harmonic currents, the primary winding of such transformer can use any of the known transformer methods, such as wye, zig-zag, delta, extended delta, or polygon.

Windings on each phase are shown as rectangles. Windings labeled PA, QA, RA, SA, and TA are the five windings associated with the A phase. Windings PB, QB, RB, SB and TB are windings with similar turns on the B phase, and PC, QC, RC, SC, and TC are the windings on the C phase of the transformer. Windings with the same first letter, for example windings PA, PB, and PC, have the same number of turns.

In analysis work these are conveniently referred to as P turns, Q turns, etc. Tappings on the P or S windings offer means to obtain intermediate output voltage amplitudes.

Figure 6:
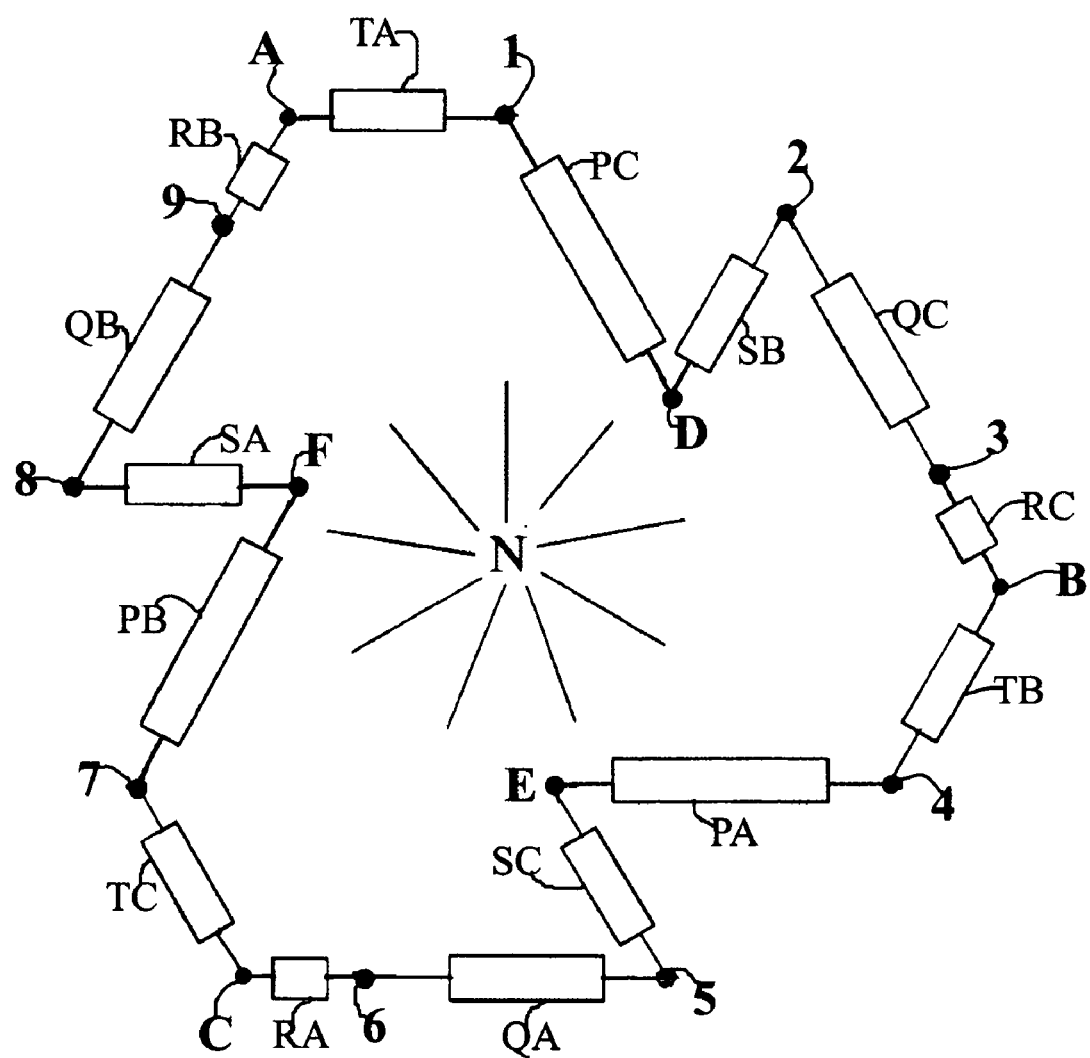

FIG. 6 shows an alternative embodiment of the invention in which the five windings per phase create a twelve-sided polygon, namely, a dodecagon.

A three-phase input voltage is applied to nodes/terminals A, B, and C on the dodecagon. A virtual neutral point labeled as N provides a reference point to define output and input voltages. For example, the voltage between A and N is one of the input line-to-neutral voltages. The voltage from node 1 to N is one of the line-to-neutral output voltages. Nine output voltages are available at nodes numbered 1 through 9. They are indicated by lines emanating from the virtual neutral node and pointing toward the node number. The output voltages are nominally of the same amplitude and typically are displaced in sequence by 40°.

Windings on each phase are shown as rectangles. Windings labeled PA, QA, RA, SA, and TA are the five windings associated with the A phase. Windings PB, QB, RB, SB and TB are windings with similar turns on the B phase, and PC, QC, RC, SC, and TC are the windings on the C phase of the transformer. Windings with the same first letter, for example windings PA, PB, and PC, have the same number of turns. In analysis work these are conveniently referred to as P turns, Q turns, R turns, etc.

Figure 1:
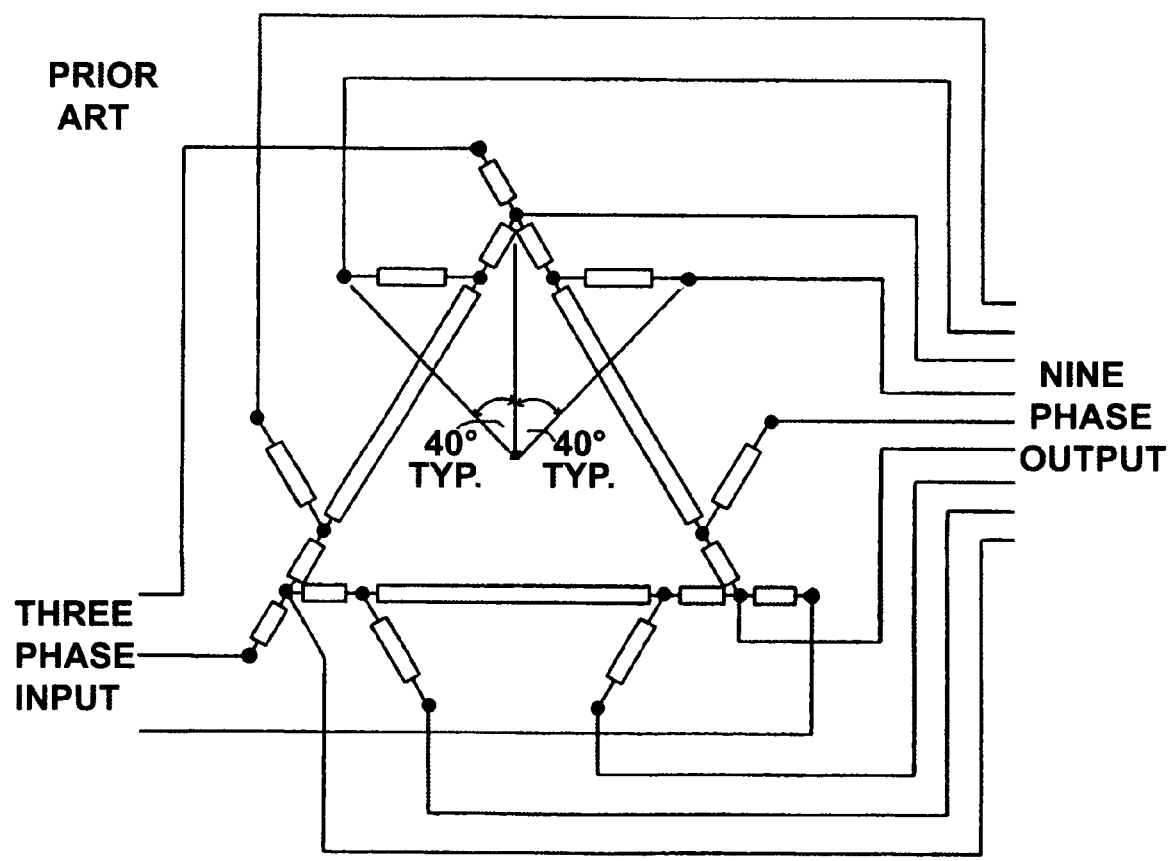
FIG. 1 shows the prior art of U.S. Pat. No. 5,124,904. In this design, a three-phase input is connected to a delta configuration by means of extender windings. The extender windings provide a simple means to reduce the amplitude of the nine-phase output voltages. Six symmetrical stub windings in conjunction with the nodes of the delta provide nine output voltages of nominally equal amplitude and phase displacement. Three lines drawn from the virtual neutral at the center of the delta illustrate three of the nine output voltage vectors with typically 40° separation.
Figure 2:
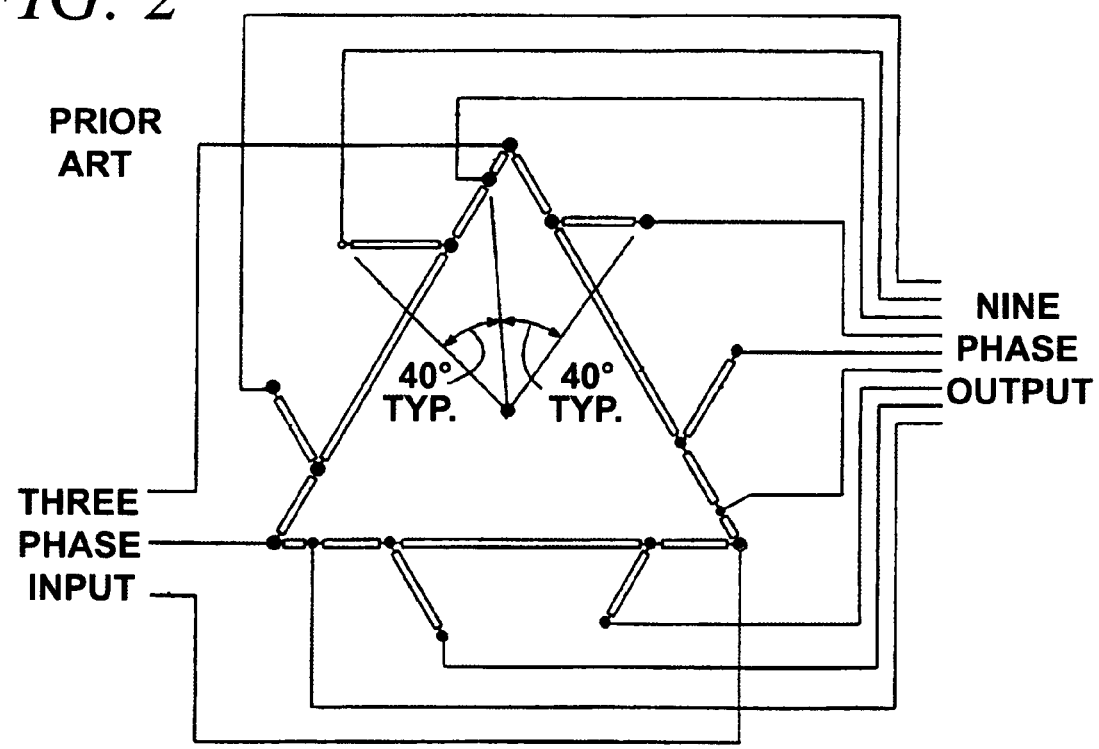
FIG. 2 shows the prior art of U.S. Pat. No. 5,619,407. In this patent, the small step down of voltage desirable for typical industrial power converters is obtained by means of six non symmetrical stub windings placed at appropriate points on the delta. A three-phase supply is applied to the apexes of the delta and a nine phase output is obtained from six stub windings and three other connections on the delta.
Figure 3:
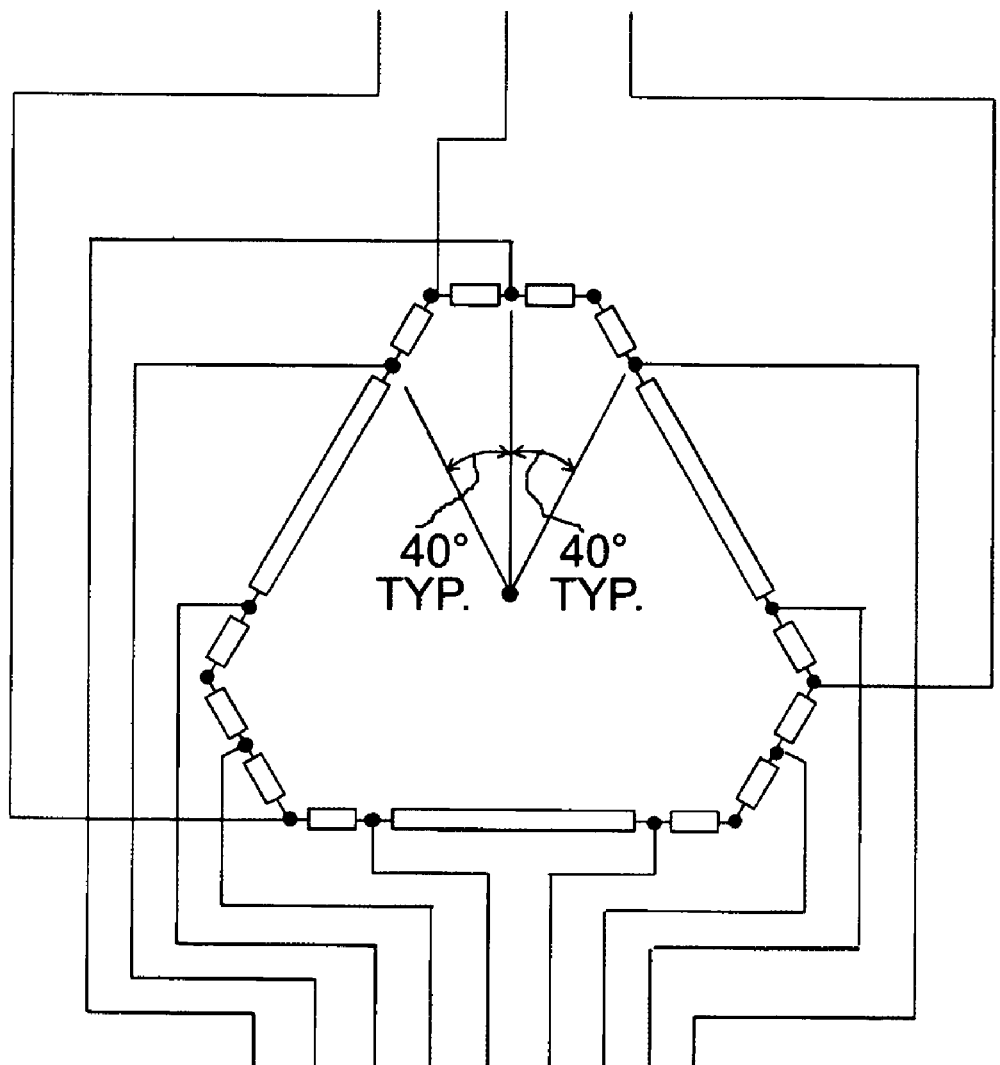
FIG. 3 shows the prior art of U.S. Pat. No. 6,335,872. This topology is excellent for loads not requiring third harmonics of current, but is inefficient for the type of load presented by a nine-phase bridge converter, which requires about 84% third harmonic current. The third harmonic current circulates around the polygon and significantly raises the rms current in the coil windings. The new winding configurations described in this application greatly reduce the amplitude of third harmonic circulating current. This results in significant reduction in transformer size.
Figure 4:
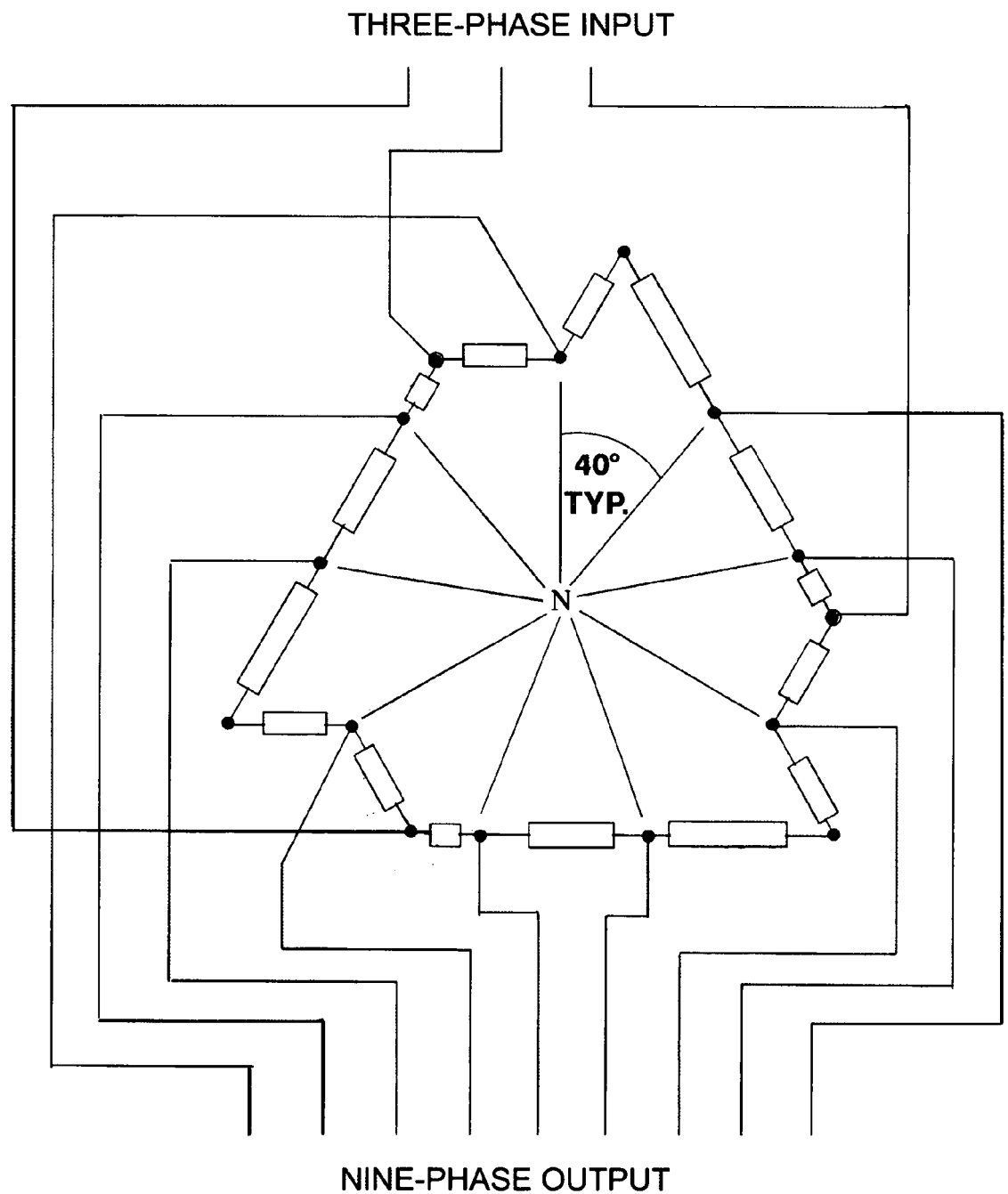
FIG. 4 shows the invention in a format similar to that used to define the prior art given in FIG. 1, FIG. 2, and FIG. 3. This basic presentation facilitates comparison of the new method with previous teachings. The invention uses unique winding ratios such that a nine-phase output is obtained using only five windings on each phase of the three-phases. The geometric shape of the topology is that of an irregular polygon. Nominally equal amplitude voltages separated by typically 40° are obtained at the output connections. The output voltage amplitude is about 11% less than that of the three-phase power source. The net result is an efficient, single-phase to nine-phase autotransformer topology.
Figure 5:
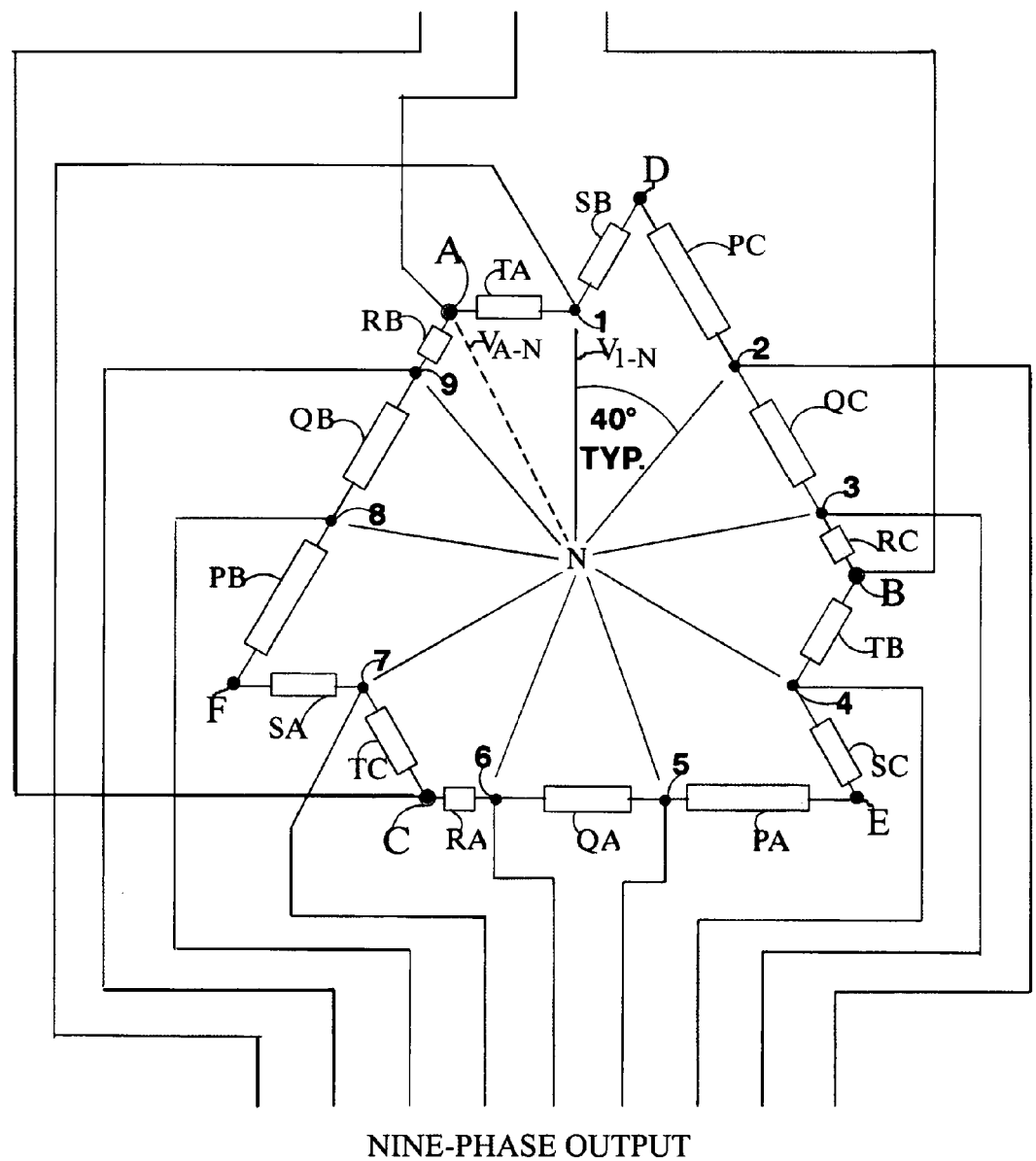
FIG. 5 shows the preferred embodiment of the invention. A three-phase input voltage is applied to nodes/terminals A, B, and C on the nonagon. A virtual neutral point, N, provides a reference point to define output and input voltages. For example, the voltage between A and N is one of the input line-to-neutral voltages. It is represented by the dashed line labeled, $V_{A-N}$. The voltage from node 1 to N is one of the line-to-neutral output voltages. It is presented by the full line labeled, $V_{1-N}$. Nine output voltages are available at nodes numbered 1 through 9. They are represented by lines emanating from the virtual neutral node and pointing toward the node number. The output voltages are nominally of the same amplitude and typically are displaced in sequence by 40°.

The topology shown in FIG. 6 gives the same exemplary performance as provided by the arrangement in FIG. 5, but the different positioning of windings PA, PB PC, SA, SB, and SC provides means for raising the output voltage. With three-phase power fed to nodes D, E, and F instead of A, B, and C, the output voltage is increased by a factor of about 2.2 times. As with the embodiment in FIG. 5, tappings on the P or S windings offer means to obtain intermediate output voltage amplitudes.

Figure 7:
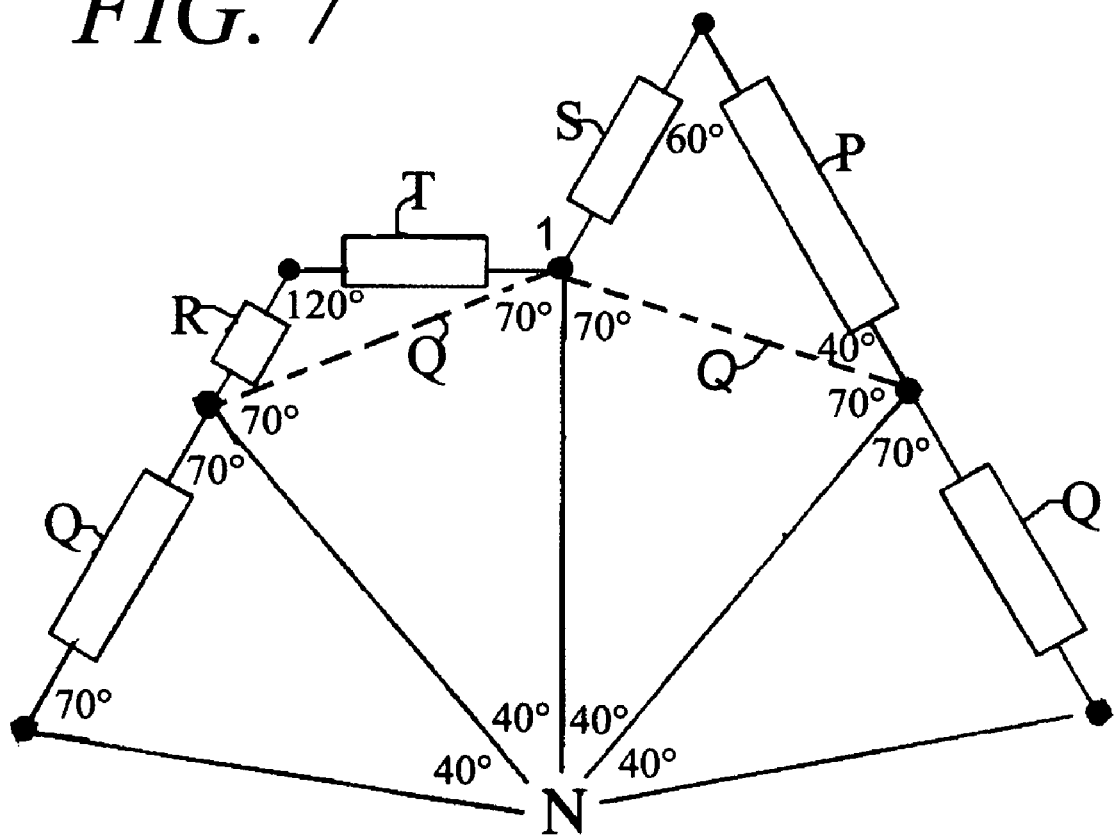

FIG. 7 shows a section of the nonagon schematic displayed in FIG. 5, set up for analysis. Winding turns are simply referred to as P, Q, R, S, and T, without reference to the particular phase involved. Construction lines are shown dashed with lengths that are expressed relative to the winding turns, and hence voltage across those turns.

Figure 8:
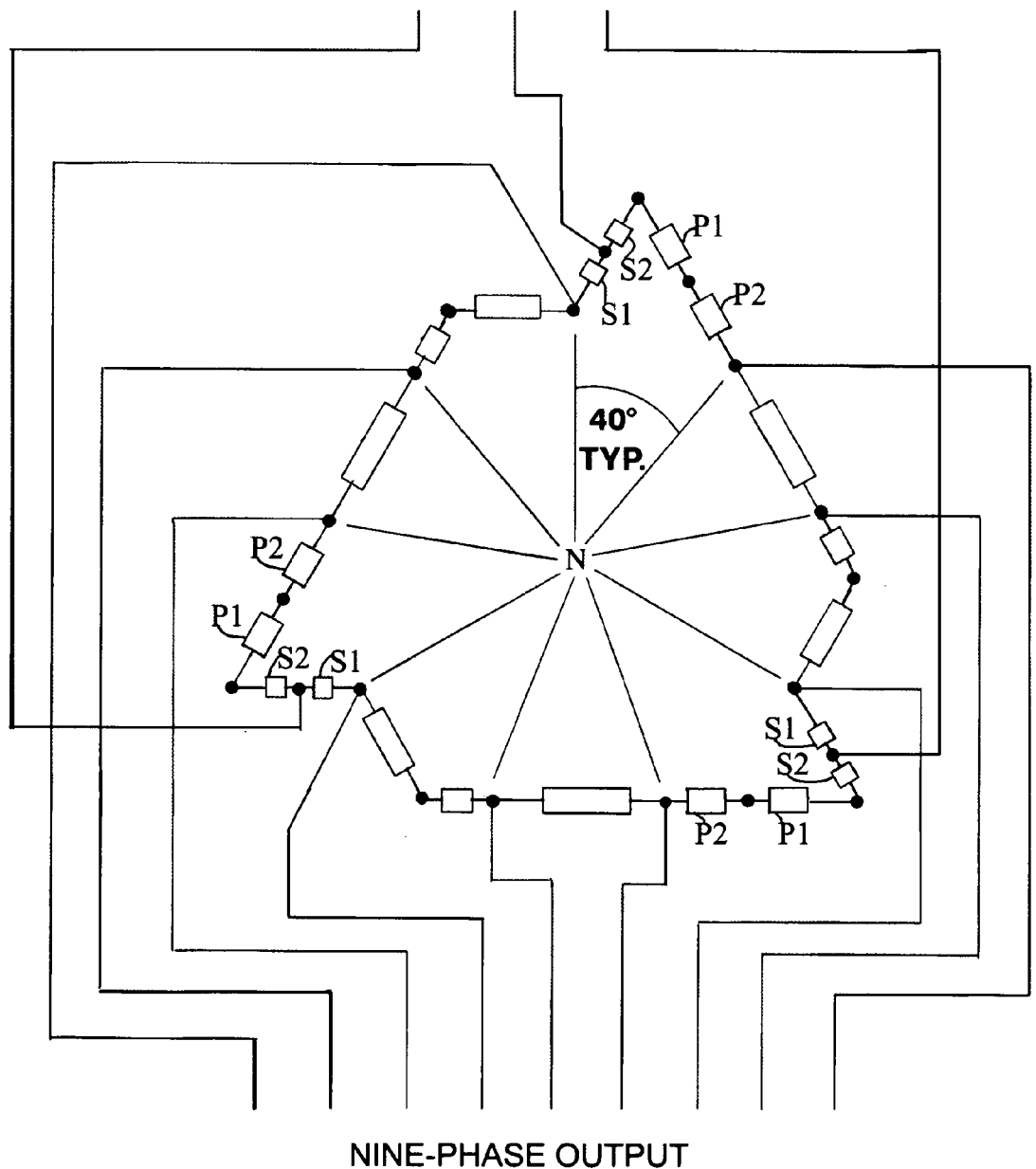

FIG. 8 gives the basic schematic of a nonagon connection in which the P and S windings on each phase are comprised of two parts, namely, P1 and P2, and S1 and S2 respectively. The sum of these parts, that is, (P1+P2) and (S1+S2) are equal to the desired total value for P and S respectively. By these means, connections are available to provide a wide range of step down in the nine-phase output voltage.

Figure 9:
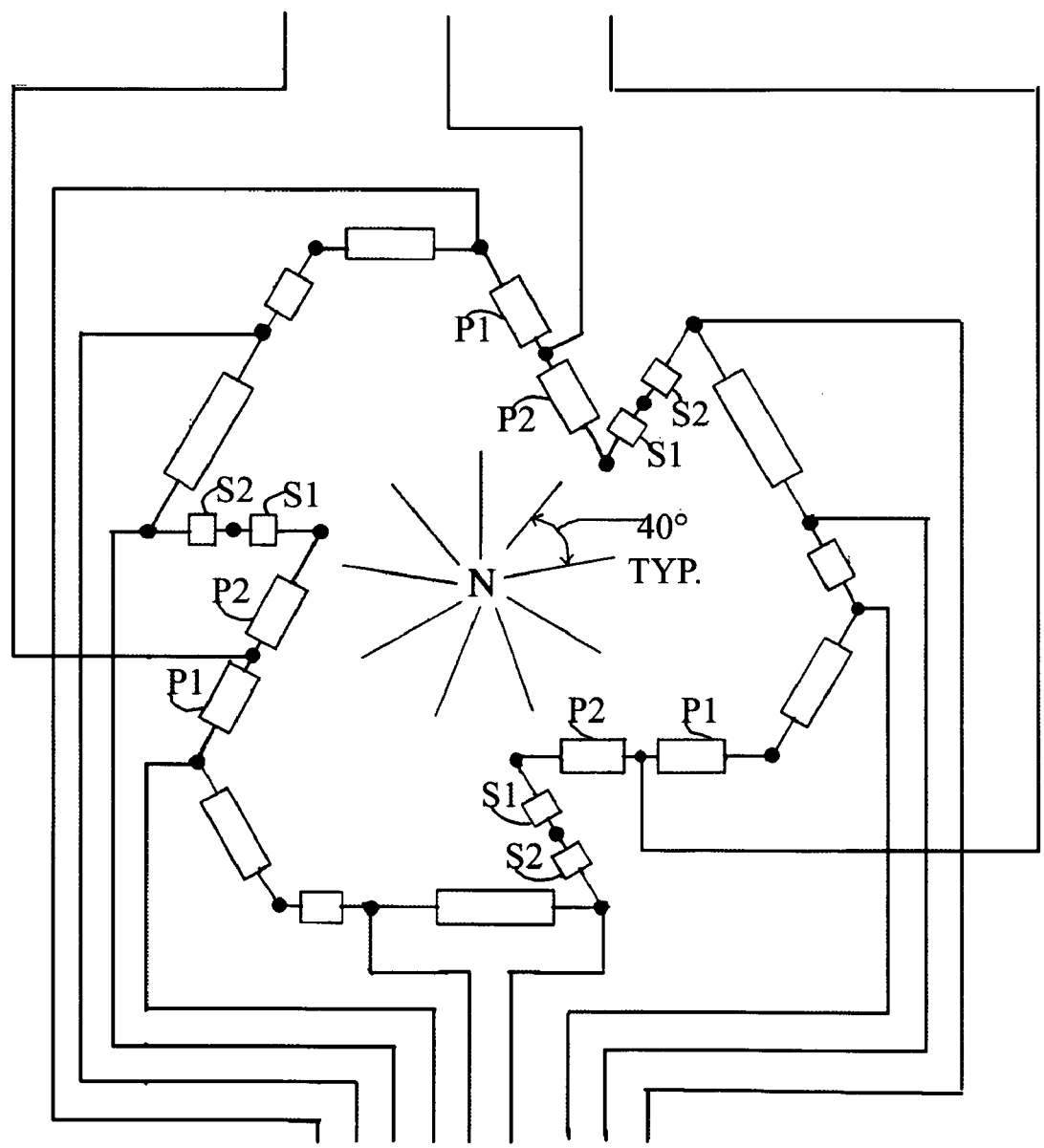

FIG. 9 gives the basic schematic of a dodecagon connection in which the P and S windings on each phase are comprised of two parts, namely, P1 and P2, and S1 and S2 respectively. The sum of these parts, that is, (P1+P2) and (S1+S2) are equal to the desired total value for P and S respectively. By these means, connections are available to provide a wide range of step up in the nine-phase output voltage.

DESCRIPTION OF THE INVENTION

The essence of the invention lies in the relative number of turns on each winding and the interconnections. By these means, circulating third harmonic currents caused by a nonlinear load, such as a nine-phase bridge converter, are reduced to a value that has tolerable effect on the winding current rating. The circulating current is much less than exists in a nine-phase polygon connection, such as described in U.S. Pat. No. 6,335,872, thus the kVA rating of the nonagon and dodecagon autotransformers taught by this invention is substantially smaller. Also, unlike the teachings of U.S. Pat. Nos. 5,124,904 and 5,619,407, stub windings are not required. By eliminating stub windings the polygon windings carry both load and circulating third harmonic currents. This results in good utilization of the copper or aluminum conductors used in the windings.

Referring to FIG. 5, apexes of the nonagon are labeled D, E, and F. A three phase supply is connected to terminals A, B, and C. A virtual neutral point defined as node N provides a convenient point of reference for describing voltage vectors. Output vectors are indicated by full lines. One of the input voltage vectors is represented by a dashed line.

Outputs are available at nodes/terminals labeled 1 through 9. On each long side of the nonagon are three windings labeled with respect to the phase, either A, B, or C, with which they are related. For example, windings such as PA, QA, RA are associated with phase A and located on the long side of the nonagon. A fourth winding, SA, on the A phase, is connected between nodes 7 and F. Also a fifth winding, TA, on the A phase is connected between nodes 1 and A.

Whether some of the nodes on the nonagon are simply tappings on a single winding or are connections of separate windings is a matter of design choice. For clarity, the discussion here assumes separate, interconnected windings.

The voltage associated with phases of the power supply line-to-neutral voltage, for example $V_{A-N}$ is represented by a dashed line drawn from the neutral point N toward node A. The amplitude of these voltages is defined as $V_N$. For example $V_{A-N}$, $V_{B-N}$, and $V_{C-N}$, all have an amplitude of $V_N$ Output voltage vectors existing from nodes 1 to 9, such as $V_{1-N}$ are assumed to have an amplitude of $V_O$. These voltages have a successive phase shift of typically 40°.

Analysis of the new topology is obtained by reference to FIG. 7 as follows:

Definitions and Assumptions:

1. Amplitude of the source line-to-neutral input voltage=$V_N$

2. Amplitude of output line-to-neutral voltage=$V_O$ with a relative value of 1.0

3. Relative fractional voltage across windings P, Q, R, S and T, is simply referenced by the winding name.

4. Nine output voltages 1 through 9, are successively at 40°

From FIG. 7:

| | | |
|---|---|---|
| Q/sin 40 = 1/sin 70 ∴ | Q = 0.68404 $V_O$ | = 0.610 $V_N$ |
| P/sin 80 = Q/sin 60 ∴ | P = 0.77786 $V_O$ | = 0.694 $V_N$ |
| S/sin 40 = Q/sin 60 ∴ | S = 0.50771 $V_O$ | = 0.453 $V_N$ |
| R/sin 20 = Q/sin 120 ∴ | R = 0.27014 $V_O$ | = 0.241 $V_N$ |
| T/sin 140 = Q/sin 120 ∴ | T = 0.50771 $V_O$ | = 0.453 $V_N$ |
| $V_N^2 = T^2 + V_O^2$ ∴ | $V_N$ = 1.12149 $V_O$ | |

The above equations define the desired winding turns ratios to achieve the required performance. They apply to both the nonagon and dodecagon configurations.

It is also possible to feed input power to the apexes/nadirs D, E, and F in the nonagon and dodecagon respectively, instead of nodes A, B, and C. In the case of the nonagon the output voltage is only about 70% that of the input voltage when the input is fed to points D, E, and F. In the case of the dodecagon the output voltage can be increased to a value that is more than twice the input voltage. Intermediate values of output voltage can be obtained by tapping windings SA, SB, SC, or PA, PB, and PC. Such tappings provide symmetrical connections for the three-phase input and allow a wide range of output voltage to be obtained.

Design Considerations

In design it is effective to first choose the R winding, which has the lowest number of turns, then select other turns as an integral number according to the ratios involved. The turns ratios are: R=1, P=2.8794 Q=2.532 S=1.8794 T=1.8794.

An example illustrates the design procedure.

Assume that R=7 turns, then using the defined ratios and selecting the nearest integer number we get; P=20 turns, Q=18 turns, R=7 turns S=13 turns, and T=13 turns.

If the input source is 470 volt then $V_N$=271.2 volt. Nominal amplitude of the nine phase output is then 271.2/1.12149, i.e., 242 volt. For a nine-phase converter this corresponds to an open circuit DC output of about 670 volts.

Other turns are selected in a similar manner. Practical variations of ±3% from the ideal ratios are generally tolerable, but final calculations are best made from computer simulations that include winding resistance and leakage inductance. Examples of some practical turns are given in table 1.

It will be clear to those skilled in the art that the three-phase to nine-phase autotransformer can be constructed using any of the standard magnetic core arrangements, including three single-phase transformers.

TABLE 1

Practical numbers of turns for nonagon and dodecagon three-phase to nine-phase autotransformer.

| R winding | P winding | Q winding | S winding | Q winding |
|---|---|---|---|---|
| 5 | 14 | 13 | 9 | 9 |
| 7 | 20 | 18 | 13 | 13 |
| 8 | 23 | 20 | 15 | 15 |
| 9 | 26 | 23 | 17 | 17 |
| 10 | 29 | 25 | 19 | 19 |
| 11 | 32 | 28 | 21 | 21 |
| 12 | 35 | 30 | 23 | 23 |
| 13 | 37 | 33 | 24 | 24 |
| 14 | 40 | 35 | 26 | 26 |
| 15 | 43 | 38 | 28 | 28 |
| 16 | 46 | 41 | 30 | 30 |

What I claim is:

1. An autotransformer for converting three-phase AC power to nine-phase AC power comprising:
   a. three coils each containing serial windings and a plurality of non-serial windings;
   b. said serial windings and plurality of non-serial windings being magnetically coupled;
   c. said windings on said coils containing a start end and a finish end such that current entering the start end produces a magnetic flux in one direction whereas a current entering the finish end produces a magnetic flux in the opposite direction;
   d. said windings being possible of at least two methods of interconnection;
   e. with a first method of interconnection obtained by joining the finish end of a non-serial winding on a third coil with the start end of a serial winding on a first coil; with the finish end of said serial winding being connected to the finish end of a non-serial winding on the third coil; with the start end of said non-serial winding being connected to the start end of a non-serial winding on the first coil;
   f. said interconnections of the first method of interconnection being repeated sequentially for all three coils until all windings are interconnected to form a nonagon;
   g. with a second method of interconnection obtained by joining the start end of a non-serial winding on a second coil with the start end of a non-serial-winding on a first coil; with the finish end of said non-serial winding being connected to the start end of a non-serial winding on a third coil; with the finish end of said non-serial winding being connected to the start end of a serial winding on the first coil; with the finish end of said serial winding being connected to the finish end of a non-serial winding on a third coil;
   h. with said interconnections of the second method of interconnection being repeated sequentially for all three coils until all windings are interconnected to form a dodecagon;
   i. said nonagon and dodecagon topologies including symmetrically disposed nodes;
   j. said symmetrically disposed nodes providing points for applying three-phase AC input voltage and extracting AC output voltages of predetermined amplitude and phase.

2. The autotransformer of claim 1 wherein the input voltage is a three-phase AC supply and the output is a nine-phase AC supply with voltages nominally equal in amplitude and typically spaced by 40°.

3. The autotransformer of claim 1 with an additional isolated winding on each coil such that three phase AC input power may be applied through such isolated windings to convert the autotransformer to a double wound transformer.

4. The autotransformer of claim 1 wherein specific amplitude AC output voltages may be less than greater than or equal to that of the three-phase AC supply.

5. The autotransformer of claim 1 wherein a similar winding on each coil is tapped to provide additional input nodes and a wide range of output voltages.

6. The autotransformer of claim 2 wherein a nine-phase output is connected to a nine-phase rectifying device so as to produce an 18-pulse converter with low output voltage ripple on the DC voltage and with low harmonic distortion of the AC input harmonic current.

7. The autotransformer of claim 2 wherein series reactance is included in the three phase AC input power source as to further attenuate high frequency harmonic currents that may be associated with a multi-pulse Ac to DC converter.

* * * * *